United States Patent
Brown et al.

(10) Patent No.: US 11,783,183 B2
(45) Date of Patent: *Oct. 10, 2023

(54) METHOD AND SYSTEM FOR ACTIVITY CLASSIFICATION

(71) Applicant: HINGE HEALTH, INC., San Francisco, CA (US)

(72) Inventors: Colin J. Brown, Montréal (CA); Andrey Tolstikhin, Montréal (CA); Thomas D. Peters, Montréal (CA); Dongwook Cho, Montréal (CA); Maggie Zhang, Montréal (CA); Paul A. Kruszewski, Montréal (CA)

(73) Assignee: HINGE HEALTH, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/173,978

(22) Filed: Feb. 11, 2021

(65) Prior Publication Data
US 2021/0161266 A1 Jun. 3, 2021
US 2022/0240638 A9 Aug. 4, 2022

Related U.S. Application Data

(63) Continuation of application No. 16/276,493, filed on Feb. 14, 2019, now Pat. No. 10,949,658.

(30) Foreign Application Priority Data

Feb. 15, 2018 (CA) ...................................... 2995242

(51) Int. Cl.
*G06V 40/20* (2022.01)
*G06N 3/08* (2006.01)
(Continued)

(52) U.S. Cl.
CPC ............... *G06N 3/08* (2013.01); *A41D 27/20* (2013.01); *A45C 1/024* (2013.01); *A45C 1/06* (2013.01);
(Continued)

(58) Field of Classification Search
CPC .. G06K 9/00342; G06K 9/00208; G06K 9/44; G06K 9/00355; G06N 3/08; G06N 3/0454; G06N 3/0481; G06N 3/0445
See application file for complete search history.

(56) References Cited

U.S. PATENT DOCUMENTS

2013/0278501 A1* 10/2013 Bulzacki ............... A63F 13/847
345/157
2014/0119640 A1* 5/2014 Craig ................... G06V 10/764
382/159
(Continued)

FOREIGN PATENT DOCUMENTS

CN  107368182 A  * 11/2017  ............. G06F 3/017
CN  107368182 A  11/2017

OTHER PUBLICATIONS

Realtime Multi-Person 2D Pose Estimation using Part Affinity Fields (IEEE 2017) (Year: 2017).*

(Continued)

*Primary Examiner* — Nizar N Sivji
(74) *Attorney, Agent, or Firm* — Perkins Coie LLP

(57) ABSTRACT

An activity classifier system and method that classifies human activities using 2D skeleton data. The system includes a skeleton preprocessor that transforms the 2D skeleton data into transformed skeleton data, the transformed skeleton data comprising scaled, relative joint positions and relative joint velocities. The system also includes a gesture classifier comprising a first recurrent neural network that receives the transformed skeleton data, and is trained to identify the most probable of a plurality of (Continued)

gestures. The system also has an action classifier comprising a second recurrent neural network that receives information from the first recurrent neural networks and is trained to identify the most probable of a plurality of actions.

15 Claims, 3 Drawing Sheets

(51) Int. Cl.
*G06N 3/04* (2006.01)
*G06V 20/64* (2022.01)
*A41D 27/20* (2006.01)
*A45C 13/18* (2006.01)
*A45C 1/02* (2006.01)
*A45C 1/06* (2006.01)
*A45F 5/02* (2006.01)
*G06N 3/045* (2023.01)
*G06V 10/34* (2022.01)

(52) U.S. Cl.
CPC ............ *A45C 13/18* (2013.01); *A45C 13/185* (2013.01); *A45F 5/022* (2013.01); *G06N 3/045* (2023.01); *G06V 10/34* (2022.01); *G06V 20/647* (2022.01); *G06V 40/23* (2022.01); *G06V 40/28* (2022.01)

(56) References Cited

U.S. PATENT DOCUMENTS

| | | | |
|---|---|---|---|
| 2016/0042227 A1* | 2/2016 | Zhong | G06V 40/23 382/103 |
| 2017/0177930 A1* | 6/2017 | Holohan | G06T 7/75 |
| 2017/0344829 A1* | 11/2017 | Lan | G06N 3/08 |
| 2018/0315200 A1* | 11/2018 | Davydov | G06V 20/52 |
| 2019/0294871 A1* | 9/2019 | Vaezi Joze | G06N 3/08 |
| 2020/0160046 A1* | 5/2020 | Andreou | G06N 3/0445 |

OTHER PUBLICATIONS

Cao et al., "Realtime Multi-Person 2D Pose Estimation using Part Affinity Fields", The Robotics Institute, Canegie Mellon University, 2017 IEEEConference on Computer and Pattern Recognition, Downloaded on Jun. 3, 2020, 9 pages.

\* cited by examiner

Figure 2
Figure 3A  Figure 3B  Figure 3C  Figured 3D

METHOD AND SYSTEM FOR ACTIVITY CLASSIFICATION

RELATED APPLICATIONS

This application is a continuation and claims priority under 35 USC 120 of U.S. application Ser. No. 16/276,493, filed Feb. 14, 2019 that in turn claims the benefit under 35 USC 119(b) to Canadian Patent Application 2,995,242 filed Feb. 15, 2018, all of which are incorporated herein by reference.

FIELD

This disclosure relates to methods and systems for the identification and classification of human gestures and actions. In particular, the disclosure relates to the identification and classification using skeletons representing human poses.

BACKGROUND

Early approaches to recognising and classifying human activities from video data employed a variety of different strategies and inference methods, including simple classifiers such as support-vector machines (SVM) and statistical state models such as hidden Markov models (HMM). These methods were often applicable only to highly constrained use cases and were not robust to the variations present in real-world data.

Modern robust methods for performing human activity classification largely rely on deep neural networks; machine learning models that have been proven across a variety of application domains. Among these methods, activity classifiers can broadly be split into two categories: a. Methods that directly consume video data as input; and b. Methods that consume skeleton data, representing the positions of human joints.

The first strategy is somewhat more general, as it requires no assumptions about the representation of humans in each frame. However, methods of this class may be more difficult to train, transfer to new application domains and may over-estimate the relationship between static visual cues and co-occurring human activities.

The second strategy decouples the problems of identifying humans in a frame and identifying their activities. This decoupling can be advantageous with respect to fast training of compact models and with respect to the portability of these models to other domains. The vast majority of these methods, however, require 3D skeleton data, which may be challenging to infer robustly and may require specialized hardware beyond standard RGB cameras. Another challenge faced by this strategy is the lack of contextual information available in the input skeleton data.

There is therefore a need for improved methods and systems for classifying activities from skeleton data.

SUMMARY

This disclosure is directed to an activity classifier system, for classifying human activities using 2D skeleton data. The system includes a skeleton preprocessor that transforms the 2D skeleton data into transformed skeleton data, the transformed skeleton data comprising scaled, relative joint positions and relative joint velocities. It also includes a gesture classifier comprising a first recurrent neural network that receives the transformed skeleton data, and is trained to identify the most probable of a plurality of gestures. There is also an action classifier comprising a second recurrent neural network that receives information from the first recurrent neural networks and is trained to identify the most probable of a plurality of actions.

BRIEF DESCRIPTION OF THE DRAWINGS

In drawings which illustrate by way of example only a preferred embodiment of the disclosure.

FIG. 2 is an example representation of a 2D skeleton with 19 joints, overlaid onto a still image from which the skeleton had been derived.

FIGS. 3A to 3D are a series of example representations of a 2D skeleton with gesture probabilities and recognized action for four snapshots from a video, overlaid with frames from the video.

DETAILED DESCRIPTION

Figure 1:
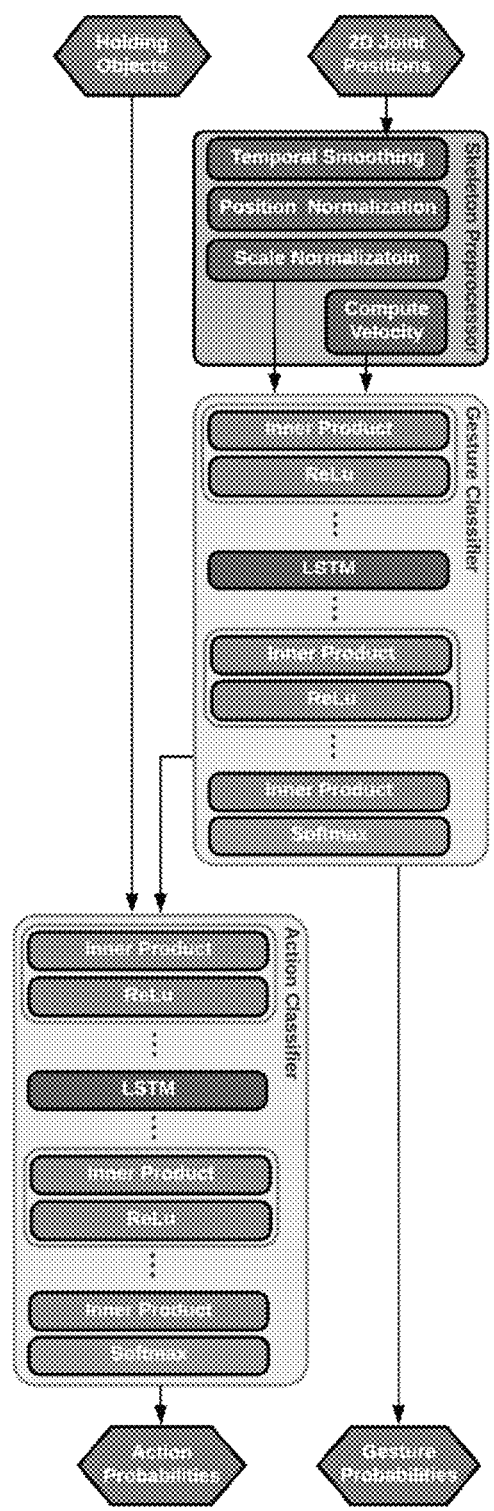
FIG. 1 is a representation of the high-level architecture of an embodiment of a activity classifier.

An activity classifier generally identifies activity, such as "lifting a ball" from source material, such as a video.

An activity classifier may use video, or partially analyzed video, such as a skeleton representing the positions of a set of labeled joints of a person's body.

The skeleton data may be 2D, encoded as an array of X and Y coordinate positions within the video frame, for each joint. The number and anatomical locations of labeled joints may vary between implementations as best suits the requirements of the situation and specific task to be performed. For example, the X and Y coordinates for the 'elbow' joint may be provided for each frame of a video sequence. Similar information may be provided for other joints in the model. This can often be extracted from video sources, even under varying lighting conditions and scene environments.

In contrast, some systems use 3D skeleton data, that includes X, Y, Z location information for joints. 3D skeleton data is often more difficult to extract, particularly from standard video and may require specialized capture equipment and higher computational costs to capture. Furthermore, 3D skeleton data may be impossible to infer unambiguously from a single RGB video source in some cases.

Other systems that accept raw video data as input, may require a much larger number of learnable parameters compared to those requirements for 2D skeleton data, making them more difficult and computationally intensive to train, tune and run. Such networks may rely on aspects of the video source, such as background information rather than the human activities, a reliance that is avoided when the network is only provided with 2D skeletons.

With reference to FIG. 2, skeleton data 50 for a single frame is indicated as dots for each joint and lines connecting associated joints. For reference, the skeleton is superimposed on the associated frame. In this example, the skeleton data includes 19 joints: feet, ankles, knees, hips, shoulders, elbows, wrists, eyes, ears and nose.

The activity classifier 10 may also use contextual information about the existence and/or class of objects that the person is interacting with. This information may be encoded as one or more Boolean variables or class index variables representing the existence and/or class of the object being interacted with from different parts of the human body. These parts of the body may include the left hand, the right hand or any other targeted body part which may be expected to interact with the environment. For a particular example, the contextual information may be: 'ornament'/'left hand'. The contextual information may be helpful to the classifier because activities may be indistinguishable without context.

This pair of input information, feature sets representing skeleton joint positions and information about contextual objects, may be provided in an order corresponding to a temporal sequence. The temporal sequence may be obtained by extracting information from sequential frames of a video. The skeleton data may be provided by a different system or system component that extracts labelled joint positions from RGB video or some other source.

Similarly, contextual information about objects may also derive from an external system, such as an object detection model.

With reference to FIG. 1, the activity classifier 10 may comprise a skeleton preprocessor 20, a gesture classifier 30 and an action classifier 40.

These components may be separate software modules, separate hardware units or portions of one or more software or hardware components. For example, the software modules may be written in the Python programming language with suitable modules, such as Caffe. The hardware includes sufficient processing and memory capacity to implement the two RNNs for the classifier.

The activity classifier may operate on a real-time stream of skeleton data such that the output of the activity classifier may indicate the most likely activity being conducted in the skeleton data at approximately the same time as the activity is represented in the skeleton data. In this way, the activity classifier may operate on video streams and provide gesture and activity information in near real-time. The system may operate in associate with broadcast, live video or other video streams to provide gesture and activity metadata in association with the video stream.

Figure 4:
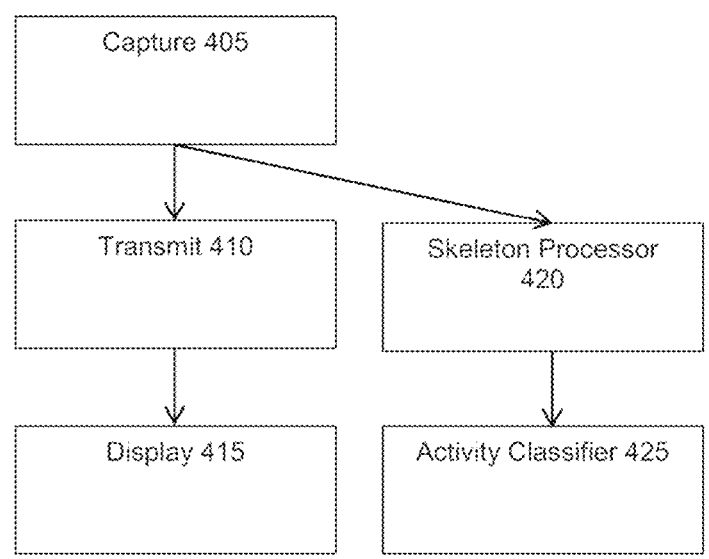
FIG. 4 represents the flow of information through a video processing system, including an activity classifier.

With reference to FIG. 4, video may be captured 405, such as using a video camera, antenna, TV receiver or other means of obtaining a video stream. The video may be stored or buffered to be streamed and processed at some time after being captured. The video stream may be transmitted 410 and displayed 415 such as on a video screen or computer screen. The video stream may also be communicated to a skeleton processor 420 for generating 2D skeletons of humans that appear in the screen.

The skeleton data may be communicated to the activity classifier 425 which, as described in more detail elsewhere, determines the likely activities being represented in the 2D skeleton data and hence in the video stream.

The output of the activity classifier may be displayed or used in parallel with or instead of the video stream. The output of the activity classifier may be provided to other systems, such as robotic interfaces, security systems, frictionless retail systems, software systems or displayed to human users. The output of the activity classifier may be displayed without the video stream in order to anonymize persons in the video and display their actions and/or gestures and/or skeletons alone, without revealing their face, body or clothing to a user.

The gesture classifier component 30 and the action classifier component 40 are both based on deep recurrent neural network (RNN) models with recurrent units, such as long-short term memory (LSTM) units. An RNN is a kind of deep neural network machine learning model that encodes temporal information through recurrent memory cells.

The RNN models may be trained on skeleton data that includes manually classified gesture and actions class annotations, or other similar source material. The training data may include temporal sequential skeleton data.

Skeleton Preprocessor

A skeleton preprocessor 20 may perform a set of basic transforms on the input joint position data obtained from the skeleton data. As a result of the basic transforms, the skeleton data may represent the human pose in a way that is expected to be most useful for the subsequent classifiers and invariant to transforms that are irrelevant to identification of activities. Such irrelevant factors may include the distance from the camera and the position in frame.

Transforms completed by the skeleton preprocessor may include: a. Temporally smoothing the positions of the joints. b. Transforming the joint positions from screen space coordinates to coordinates that are relative to the persons' position. For example, the joint positions may be determined relative to the neck or pelvis joint positions. c. Scaling the relative joint positions to be relative to the person's height. The person's height may be estimated from other features of the skeleton data by the skeleton preprocessor. d. Computing the velocity of each scaled joint position.

The output of the skeleton preprocessor is a set of scaled, relative joint positions and a set of scaled, joint velocities. Some or all of these transforms may not be needed, depending on the quality and processing already completed on the source skeleton data. For example, if all the source skeleton data is taken from a fixed camera distance and location, scaling may not be required.

Gesture Classifier

A gesture classifier component 30 of the activity classifier 10 takes as input the pre-processed joint features from the skeleton preprocessor. A gesture classifier infers a set of probabilities of different gestures.

A pre-selected set of gesture classes may be determined in advance. The set of gesture classes is intended to comprise simple movements of the human body and generalizes specific human movements. For example, the gesture classes may include reach arm, turn head, point finger. The gesture classes may include a neutral pose, or 'none' class. The set of classes may also include an 'other' class to represent the space of non-neutral gestures that are not of specific interest.

With reference to FIGS. 3A to 3D, examples of pre-selected gestures may include 'none', 'retract', 'reach', 'low retract', 'low reach'. In FIG. 3A, a skeleton is shown that has been identified as most likely not having any apparent gesture, reflected in the high probability of 'none'.

In FIG. 3B, the skeleton is identified as most probably in the 'reach' gesture. In FIG. 3C, the most probable gesture is identified as 'retract'. In FIG. 3D, the most probable gesture is identified as 'retract' with 'none' being the second most probable. The action classifier may consider this sequence of gestures, of which the Figures are only representative snapshots of a video sequences and the 2D skeletons from the sequence, as 'ornament added to tree'.

With reference to FIGS. 3A to 3D, the pink boxes represent likely locations of contextual objects being manipulated by the human. The label stating 'holding' in FIG. 3A and 'not holding' in FIGS. 3B to 3D represent the most likely status of whether the human is holding some contextual object.

While the gesture classifier component only infers the gesture probabilities of a skeleton at a single point in time, it may rely on a memory of previous states to perform the inference. The component therefore may assume a sequential feed of data. The gesture classifier component may operate independently of the action classifier, and without contextual object information.

A gesture classifier component is based on a deep RNN with inner-product (IP) layers, rectified linear unit (ReLU) layers, and recurrent layers such as LSTM layers. In particular, a gesture classifier component comprises one or more pairs of IP and ReLU layers, followed by one or more LSTM layers, followed by zero or more pairs of IP and ReLU layers, followed by a final IP layer. The result of this final IP layer may be passed to a subsequent action classifier component and/or output as inferred class probabilities, possibly after being normalized, such as with softmax normalization. In the latter case, these gesture class probabilities may be used to infer a most probable gesture class. The intention of placing LSTM layers between blocks of IP, ReLU groups is to enable temporally informed inferencing by the LSTM to occur in a transformed space where information about individual joints are combined and/or filtered in a manner found to be most discriminative by the training procedure.

The gesture classifier may comprise between five to ten stacked IP, ReLU and LSTM layers and each hidden layer may comprise dozens to hundreds of hidden units. The specific value of these parameters may depend on the amount of available training data and the complexity of the gestures and actions being detected.

Action Classifier

An action classifier component of the activity classifier builds on the gesture classifier component. The action classifier may accept features extracted from a hidden layer in the gesture classifier, such as the layer prior to the final IP layer of the gesture classifier RNN.

These features are assumed to provide rich information pertinent to inferring gesture probabilities and are also independent of the specific number of classes being predicted by the gesture classifier. This architecture is designed to leverage salient features learned by the gesture classifier component. This is done under the assumption that these features are also pertinent for predicting actions.

As mentioned above, an action classifier component may also use contextual information about the existence or class of object or objects that the human is interacting with.

Similar to a gesture classifier component, the action classifier component is a deep RNN and may require a sequential feed of input data in order to leverage temporal cues via the memory units in the LSTM layers. Specifically, an action classifier component comprises one or more pairs of IP and ReLU layers, followed by one or more LSTM layers, followed by zero or more pairs of IP and ReLU layers, followed by a final IP layer with softmax normalization. The optimal number of layers and number of hidden units in each layer may be similar to the respective parameters of the gesture classifier component and may depend on the amount of available training data and the complexity of the actions and actions being detected.

Also, similar to a gesture classifier component, the output of the action classifier component is a set of action class probabilities for the current input, given the history of previous inputs. A pre-selected set of action classes may be determined in advance. The set of action classes is intended to comprise complex or compound movements of the human body, possibly involving interactions with contextual objects, and generalize specific human actions.

Training Procedure

The gesture classifier component and action classifier component RNNs contain trainable parameters that define the behaviours of their respective components. These parameters may be learned by training the gesture and action component RNNs using labelled gesture and action training data.

The gesture classifier component RNN may be trained first, independently of the action component RNN. Gesture training data may comprise sequences of real 2D skeleton sequences inferred from captured video or synthetically generated sequences of skeletons and corresponding gesture class labels for each skeleton.

The action classifier component RNN may be trained in the context of the entire activity classifier with a pre-trained gesture classifier component RNN that either has fixed training parameters or tunable training parameters, which are updated based on training of the entire system. Action training data comprises sequences of real or synthetic 2D skeleton data and corresponding action class labels for each skeleton.

Appropriate training data may comprise thousands of sequences demonstrating many examples of each gesture or action to be identified by the classifier.

Conclusion

The systems and methods described above provide a neural-network based activity classifier to detect activities hierarchically, with a low-level gesture recognition as parts of higher-level action classifier. The system network architecture relates to the hierarchy of complexity of the activities being detected.

This architecture provides: a. simultaneous inference of human activities at multiple scales of complexity; b. Modularity that facilitates evaluation, testing, debugging, and replacement of specific components of the model. This can be important for experimenting or migrating the model to new domains of activity classes; and c. Ease of model training due to the predominantly linear structure of the network as compared to more complex network topologies, which may require many training steps.

Various embodiments of the present disclosure having been thus described in detail by way of example, it will be apparent to those skilled in the art that variations and modifications may be made without departing from the disclosure. The disclosure includes all such variations and modifications as fall within the scope of the appended claims.

What is claimed is:

1. An activity classifier system, for classifying human activities using two-dimensional (2D) skeleton data comprising joint positions, the system comprising:
   a skeleton preprocessor that transforms the 2D skeleton data into transformed skeleton data by—
      temporally smoothing the joint positions,
      transforming the joint positions to be relative to one of the joint positions,
      scaling the joint positions to a height of a feature of the 2D skeleton data, and
      computing a velocity of each of the joint positions,
      wherein the transformed skeleton data comprising scaled, relative joint positions and joint velocities;
   a gesture classifier comprising a first recurrent neural network that receives the transformed skeleton data, and is trained to identify a most probable gesture of a plurality of gestures; and
   an action classifier comprising a second recurrent neural network that receives information from the first recurrent neural network and is trained to identify a most probable action of a plurality of actions, wherein the first recurrent neural network is trained on data comprising 2D skeleton sequences with associated gesture labels, and wherein the second recurrent neural network is trained with a pre-trained first recurrent neutral network and 2D skeleton sequences with associated action labels.

2. The activity classifier system of claim 1, wherein the action classifier further receives contextual object information comprising an object identifier and a joint identifier for any contextual objects associated with a joint, and wherein the second recurrent neural network is further trained with contextual object and joint information.

3. The activity classifier of claim 1, wherein the plurality of gestures comprise a set of gesture classes.

4. The activity classifier of claim 1, wherein the plurality of actions comprise a set of action classes.

5. The activity classifier of claim 1, wherein the first recurrent neural network comprises at least one inner product layer, at least one rectified linear unit layers, and at least one long-short term memory layer.

6. The activity classifier of claim 5, wherein the first recurrent neural network comprises one or more pairs of inner product and rectified linear unit layers, followed by at least one long-short term memory layer, followed by zero or more pairs of inner product and rectified linear unit layers, followed by an inner product layer.

7. The activity classifier of claim 6, wherein the information received by the second recurrent neural network from the first recurrent neural networks is from a layer prior to a final inner product layer.

8. The activity classifier of claim 1, wherein the second recurrent neural network comprises one or more pairs of inner product and rectified linear unit layers, followed by at least one long-short term memory layer, followed by zero or more pairs of inner product and rectified linear unit layers, followed by an inner product layer.

9. method of classifying human activities using two-dimensional (2D) skeleton data comprising joint positions, the method comprising:
pre-processing the joint position data by transforming the 2D skeleton data into transformed skeleton data by—
temporally smoothing the joint positions,
transforming the joint positions to be relative to one of the joint positions,
scaling the joint positions to a height of a feature of the 2D skeleton data, and
computing a velocity of each of the joint positions,
wherein the transformed skeleton data comprises scaled, relative joint positions and joint velocities;
classifying gestures using a first recurrent neural network that receives the transformed skeleton data, and is trained to identify a most probable gesture of a plurality of gestures; and
classifying actions using a second recurrent neural network that receives information from the first recurrent neural network and is trained to identify a most probable action of a plurality of actions,
wherein the first recurrent neural network is trained on data comprising 2D skeleton sequences with associated gesture labels, and
wherein the second recurrent neural network is trained with a pre-trained first recurrent neutral network and 2D skeleton sequences with associated action labels.

10. The method of claim 9, wherein the plurality of gestures comprise a set of gesture classes.

11. The method of claim 9, wherein the plurality of actions comprise a set of action classes.

12. The method of claim 9, wherein the first recurrent neural network comprises at least one inner product layer, at least one rectified linear unit layers, and at least one long-short term memory layer.

13. The method of claim 12, wherein the first recurrent neural network comprises one or more pairs of inner product and rectified linear unit layers, followed by at least one long-short term memory layer, followed by zero or more pairs of inner product and rectified linear unit layers, followed by an inner product layer.

14. The method of claim 13, wherein the information received by the second recurrent neural network from the first recurrent neural networks is from a layer prior to a final inner product layer.

15. The method of claim 9, wherein the second recurrent neural network comprises one or more pairs of inner product and rectified linear unit layers, followed by at least one long-short term memory layer, followed by zero or more pairs of inner product and rectified linear unit layers, followed by an inner product layer.

* * * * *